United States Patent
Murata et al.

(10) Patent No.: US 12,304,343 B2
(45) Date of Patent: May 20, 2025

(54) METHOD OF CONTROLLING BATTERY REPLACEMENT, BATTERY REPLACEMENT CONTROL DEVICE, AND BATTERY REPLACEMENT CONTROL SYSTEM

(71) Applicant: TOYOTA JIDOSHA KABUSHIKI KAISHA, Toyota (JP)

(72) Inventors: Soshiro Murata, Toyota (JP); Hiroshi Umeno, Nisshin (JP); Takahiro Nomura, Okazaki (JP); Yuya Onozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/382,779

(22) Filed: Oct. 23, 2023

(65) Prior Publication Data

US 2024/0166081 A1 May 23, 2024

(30) Foreign Application Priority Data

Nov. 22, 2022 (JP) .................. 2022-186794

(51) Int. Cl.
*B60L 53/80* (2019.01)
*B60L 58/12* (2019.01)
(Continued)

(52) U.S. Cl.
CPC .............. *B60L 53/80* (2019.02); *B60L 58/12* (2019.02); *B60S 5/06* (2013.01); *G06Q 10/02* (2013.01)

(58) Field of Classification Search
CPC . B60L 53/80; B60L 58/12; B60S 5/06; G06Q 10/02
(Continued)

(56) References Cited

U.S. PATENT DOCUMENTS

2013/0345976 A1* 12/2013 Li ..................... G01C 21/3476
701/533
2015/0149015 A1*  5/2015 Nakano ................. B60L 53/80
701/22
(Continued)

FOREIGN PATENT DOCUMENTS

CN          107194530 B      9/2020
WO     WO-2011014773 A2 *   2/2011    ............. B60L 53/00
WO        2021/251024 A1    12/2021

OTHER PUBLICATIONS

"Electric Vehicles Database," ev-database.org, May 28, 2022. https://web.archive.org/web/20220528141224/https://ev-database.org/imp/#expand. pp. 1-3. (Year: 2022).*
(Continued)

*Primary Examiner* — Jeff Zimmerman
*Assistant Examiner* — Hunter Molnar
(74) *Attorney, Agent, or Firm* — Dinsmore & Shohl LLP

(57) ABSTRACT

A method of controlling battery replacement includes obtaining information on a battery (first battery) and giving a notification that encourages battery replacement to a user of an electrically powered vehicle when a battery (second battery) lower in SOC than the battery is provided at a battery station (battery replacement station). The method of controlling battery replacement includes controlling the battery station such that the battery and the battery lower in SOC than the battery are replaced with each other.

18 Claims, 4 Drawing Sheets

(51) Int. Cl.
*B60S 5/06* (2019.01)
*G06Q 10/02* (2012.01)

(58) Field of Classification Search
USPC .............................................................. 705/5
See application file for complete search history.

(56) References Cited

U.S. PATENT DOCUMENTS

| | | | |
|---|---|---|---|
| 2019/0202415 A1* | 7/2019 | Lai | G06Q 10/025 |
| 2019/0283605 A1* | 9/2019 | Koebler | G01C 21/34 |
| 2022/0036330 A1* | 2/2022 | Ong | G06Q 30/0645 |
| 2022/0388422 A1 | 12/2022 | Naito et al. | |
| 2023/0116812 A1* | 4/2023 | Yamauchi | H02J 7/0063 |
| | | | 705/14.17 |
| 2023/0311701 A1* | 10/2023 | Wang | B60L 53/80 |
| | | | 320/109 |

OTHER PUBLICATIONS

W. Wang and H. Yang, "Joint Optimization of Battery Swapping Station Revenue and Electric Vehicle Owners' Benefits by Introducing Tiered Pricing Incentives," IECON 2022—48th Annual Conference of the IEEE Industrial Electronics Society, Brussels, Belgium, 2022, pp. 1-6. (Year: 2022).*

* cited by examiner

METHOD OF CONTROLLING BATTERY REPLACEMENT, BATTERY REPLACEMENT CONTROL DEVICE, AND BATTERY REPLACEMENT CONTROL SYSTEM

CROSS REFERENCE TO RELATED APPLICATIONS

This nonprovisional application is based on Japanese Patent Application No. 2022-186794 filed with the Japan Patent Office on Nov. 22, 2022, the entire contents of which are hereby incorporated by reference.

BACKGROUND

Field

The present disclosure relates to a method of controlling battery replacement, a battery replacement control device, and a battery replacement control system.

Description of the Background Art

Chinese Patent No. 107194530 discloses transfer of a battery charged in another charging facility to a battery replacement station, instead of charging of the battery at the battery replacement station.

SUMMARY

In a system in Chinese Patent No. 107194530, the battery charged in another charging facility is transferred to the battery replacement station as above. Since it takes time for charging of the battery and transfer of the battery in this system, it may become difficult to prepare a battery for battery replacement at the battery replacement station. Facilitation of preparation of a battery for battery replacement at a battery station has been demanded.

The present disclosure was made to solve the problem above, and an object thereof is to provide a method of controlling battery replacement, a battery replacement control device, and a battery replacement control system that can facilitate preparation of a battery for battery replacement at a battery replacement station.

A method of controlling battery replacement according to a first aspect of the present disclosure is a method of controlling battery replacement at a battery replacement station provided with at least one battery that is replaced with a battery of an electrically powered vehicle. The battery of the electrically powered vehicle is a first battery. The battery provided at the battery replacement station is a second battery. The method includes obtaining information on the first battery, giving a user of the electrically powered vehicle a notification that encourages the battery replacement when the second battery lower in state of charge (SOC) than the first battery is provided at the battery replacement station, and controlling the battery replacement station such that the first battery and the second battery lower in SOC than the first battery are replaced with each other.

In the method of controlling battery replacement according to the first aspect of the present disclosure, when the second battery lower in SOC than the first battery is provided at the battery replacement station as above, a notification that encourages battery replacement is given to the user of the electrically powered vehicle. The first battery and the second battery lower in SOC than the first battery can thus be replaced with each other. Consequently, the SOC of the battery stored at the battery replacement station can be increased without charging of the battery. Preparation of a battery for battery replacement at the battery replacement station can thus be facilitated.

The method of controlling battery replacement according to the first aspect includes obtaining information on the number of batteries intended for replacement at the battery replacement station. The giving a notification is giving a notification that encourages the battery replacement when the number of intended batteries is larger than the number of second batteries having an SOC equal to or larger than a prescribed first threshold value. According to such a configuration, being out-of-stock of the second battery having the SOC equal to or larger than the prescribed first threshold value can be suppressed. Consequently, preparation of the battery for battery replacement at the battery replacement station can further be facilitated.

In this case, the obtaining information on the number of intended batteries includes obtaining information on the number of bookings of the battery replacement at the battery replacement station. According to such a configuration, a schedule of battery replacement at the battery replacement station can accurately be predicted. Consequently, being out-of-stock of the second battery having the SOC equal to or larger than the prescribed first threshold value can further be suppressed.

The method of controlling battery replacement according to the first aspect further includes obtaining position information of the electrically powered vehicle, obtaining information on an electric mileage of the electrically powered vehicle, and calculating first to-be-consumed electric power required for the electrically powered vehicle arrives at the battery replacement station. The giving a notification is giving a notification that encourages the battery replacement when a difference between the SOC of the first battery and the SOC of the second battery lower in SOC than the first battery is equal to or larger than the SOC corresponding to the first to-be-consumed electric power. According to such a configuration, the SOC of the first battery at the time point of arrival of the electrically powered vehicle at the battery replacement station can be higher than the SOC of the second battery.

The method of controlling battery replacement according to the first aspect further includes obtaining information on a destination of the electrically powered vehicle, obtaining information on an electric mileage of the electrically powered vehicle, and calculating second to-be-consumed electric power required for arrival at the destination from the battery replacement station. The giving a notification includes giving a notification that encourages the battery replacement when the SOC of the second battery lower in SOC than the first battery is equal to or higher than the SOC corresponding to the second to-be-consumed electric power. According to such a configuration, failure in arrival at the destination, of the electrically powered vehicle that has replaced the battery at the battery replacement station, due to weak battery, can be suppressed.

The method of controlling battery replacement according to the first aspect further includes obtaining information on an electric mileage of the electrically powered vehicle, obtaining position information of at least one of another battery replacement station and a battery charging facility, and calculating third to-be-consumed electric power required for arrival at the another battery replacement station or the battery charging facility from the battery replacement station. The giving a notification includes giving a notification that encourages the battery replacement when the SOC of the second battery lower in SOC than the first battery is equal to or higher than the SOC corresponding to the third to-be-consumed electric power. According to such a configuration, failure in arrival at another battery replacement station or a battery charging facility, of the electrically powered vehicle that has replaced the battery at the battery replacement station, due to weak battery, can be suppressed.

The method of controlling battery replacement according to the first aspect further includes obtaining information on an electric mileage of the electrically powered vehicle. The giving a notification is giving a notification that encourages the battery replacement when the electric mileage is more than a prescribed second threshold value. According to such a configuration, the SOC of the electrically powered vehicle at a time point of arrival at the battery replacement station can be relatively be high.

A battery replacement control device according to a second aspect of the present disclosure is a battery replacement control device that controls a battery replacement station provided with at least one battery that is replaced with a battery of an electrically powered vehicle. The battery of the electrically powered vehicle is a first battery. The battery provided at the battery replacement station is a second battery. The battery replacement control device includes an obtaining unit that obtains information on the first battery and a controller that gives a notification that encourages the battery replacement to a user of the electrically powered vehicle when the second battery lower in SOC than the first battery is provided at the battery replacement station. The controller controls the battery replacement station such that the first battery and the second battery lower in SOC than the first battery are replaced with each other.

In the battery replacement control device according to the second aspect of the present disclosure, when the second battery lower in SOC than the first battery is provided at the battery replacement station as above, a notification that encourages battery replacement is given to the user of the electrically powered vehicle. A battery replacement control device capable of facilitation of preparation of a battery for battery replacement at the battery replacement station can thus be provided.

A battery replacement control system according to a third aspect of the present disclosure includes a first processing apparatus that processes battery replacement at a battery replacement station provided with at least one battery that is replaced with a battery of an electrically powered vehicle, the battery of the electrically powered vehicle being a first battery, the battery provided at the battery replacement station being a second battery, and a second processing apparatus that gives a notification that encourages the battery replacement to a user of the electrically powered vehicle when the second battery lower in SOC than the first battery is provided at the battery replacement station. The second processing apparatus controls the first processing apparatus such that the first battery and the second battery lower in SOC than the first battery are replaced with each other.

In the battery replacement control system according to the third aspect of the present disclosure, when the second battery lower in SOC than the first battery is provided at the battery replacement station as above, a notification that encourages battery replacement is given to the user of the electrically powered vehicle. A battery replacement control system capable of facilitation of preparation of a battery for battery replacement at the battery replacement station can thus be provided.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
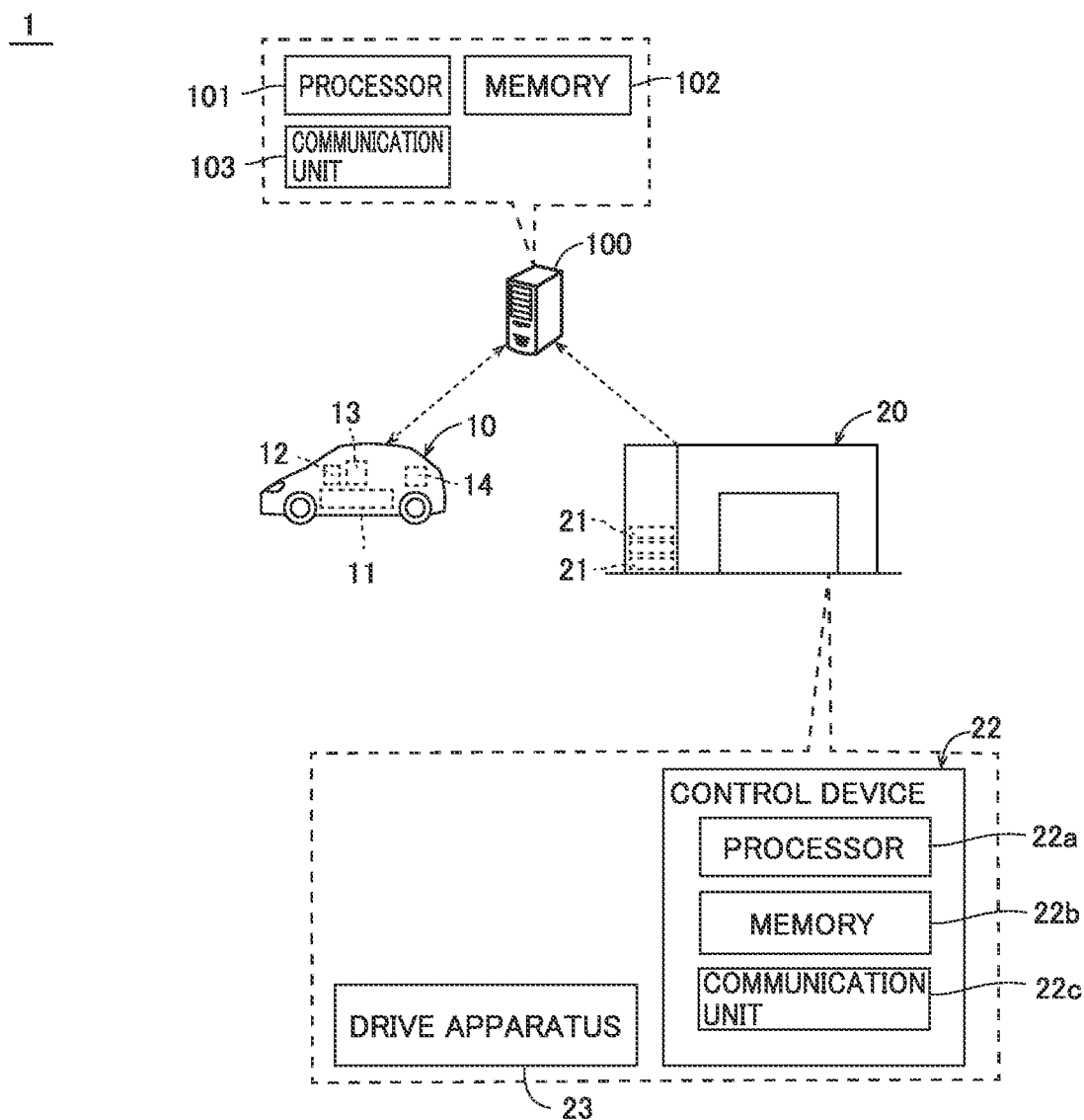
FIG. 1 is a diagram showing a configuration of a control system according to one embodiment.

An embodiment of the present disclosure will be described in detail below with reference to the drawings. The same or corresponding elements in the drawings have the same reference characters allotted and description thereof will not be repeated.

FIG. 1 is a diagram showing a configuration of a battery replacement control system 1 according to the present embodiment. Control system 1 includes a server 100, an electrically powered vehicle 10, and a battery station 20. Battery replacement and battery station 20 represent exemplary "battery replacement" and an exemplary "battery replacement station" in the present disclosure, respectively. Server 100 represents exemplary "battery replacement control device" and an exemplary "second processing apparatus" in the present disclosure.

Electrically powered vehicle 10 includes a battery 11, a navigation system 12, an electronic control unit (ECU) 13, and a communication instrument 14. Battery 11 represents an exemplary "first battery" in the present disclosure.

Battery 11 supplies electric power to various electrical components such as a not-shown motor for travel of electrically powered vehicle 10. ECU 13 controls various electrical components of electrically powered vehicle 10 including navigation system 12 and communication instrument 14. Communication instrument 14 and server 100 can communicate with each other. Server 100 may communicate with a not-shown portable terminal or the like owned by a user of electrically powered vehicle 10.

Battery station 20 includes a plurality of batteries 21 that replace battery 11 of electrically powered vehicle 10. Battery station 20 is provided at a position different from server 100. Battery 21 may be equal to battery 11 in capacity of stored power. Battery 21 may be different from battery 11 in capacity of stored power. Battery 21 represents an exemplary "second battery" in the present disclosure.

Battery station 20 includes a control device 22 and a drive apparatus 23. Control device 22 represents an exemplary "first processing apparatus" in the present disclosure.

Control device 22 includes a processor 22a, a memory 22b, and a communication unit 22c. Not only a program to be executed by processor 22a but also information (for example, a map, a mathematical expression, and various parameters) to be used in the program are stored in memory 22b. Processor 22a controls drive apparatus 23.

Communication unit 22c includes various communication I/Fs. Processor 22a controls communication unit 22c. Communication unit 22c communicates with server 100.

Control device 22 processes battery replacement at battery station 20 by controlling drive apparatus 23 (to drive). Specifically, drive apparatus 23 includes a movement mechanism that finely adjusts a position of electrically powered vehicle 10 to a battery replacement position, a lifting mechanism that moves up and down electrically powered vehicle 10, a mechanism that replaces batteries, and the like. Detailed description and illustration of each mechanism will not be given herein.

Server 100 is a server that manages (controls) battery replacement of electrically powered vehicle 10 at battery station 20. Server 100 includes a processor 101, a memory 102, and a communication unit 103. Processor 101 and communication unit 103 are an exemplary "controller" and an exemplary "obtaining unit" in the present disclosure, respectively.

Not only a program to be executed by processor 101 but also information (for example, a map, a mathematical expression, and various parameters) to be used in the program are stored in memory 102. Position information of battery station 20 is stored in memory 102. Processor 101 controls communication unit 103. Communication unit 103 includes various communication I/Fs.

In a conventional control system, a battery charged in a charging facility different from a battery station is transferred to the battery station and a battery of an electrically powered vehicle is replaced with the transferred battery. Since it takes time for charging of the battery and transfer of the battery in this system, it may become difficult to prepare a battery for battery replacement at the battery station. Facilitation of preparation of a battery for battery replacement at a battery station has been demanded.

In the present embodiment, when battery 21 lower in SOC than battery 11 is provided at battery station 20, a notification that encourages battery replacement is given to a user of electrically powered vehicle 10. Replacement between battery 11 and battery 21 lower in SOC than battery 11 can increase the SOC of the battery at battery station 20 without charging of the battery at another charging facility or the like.

(Sequence Control in Control System)

Figure 2:
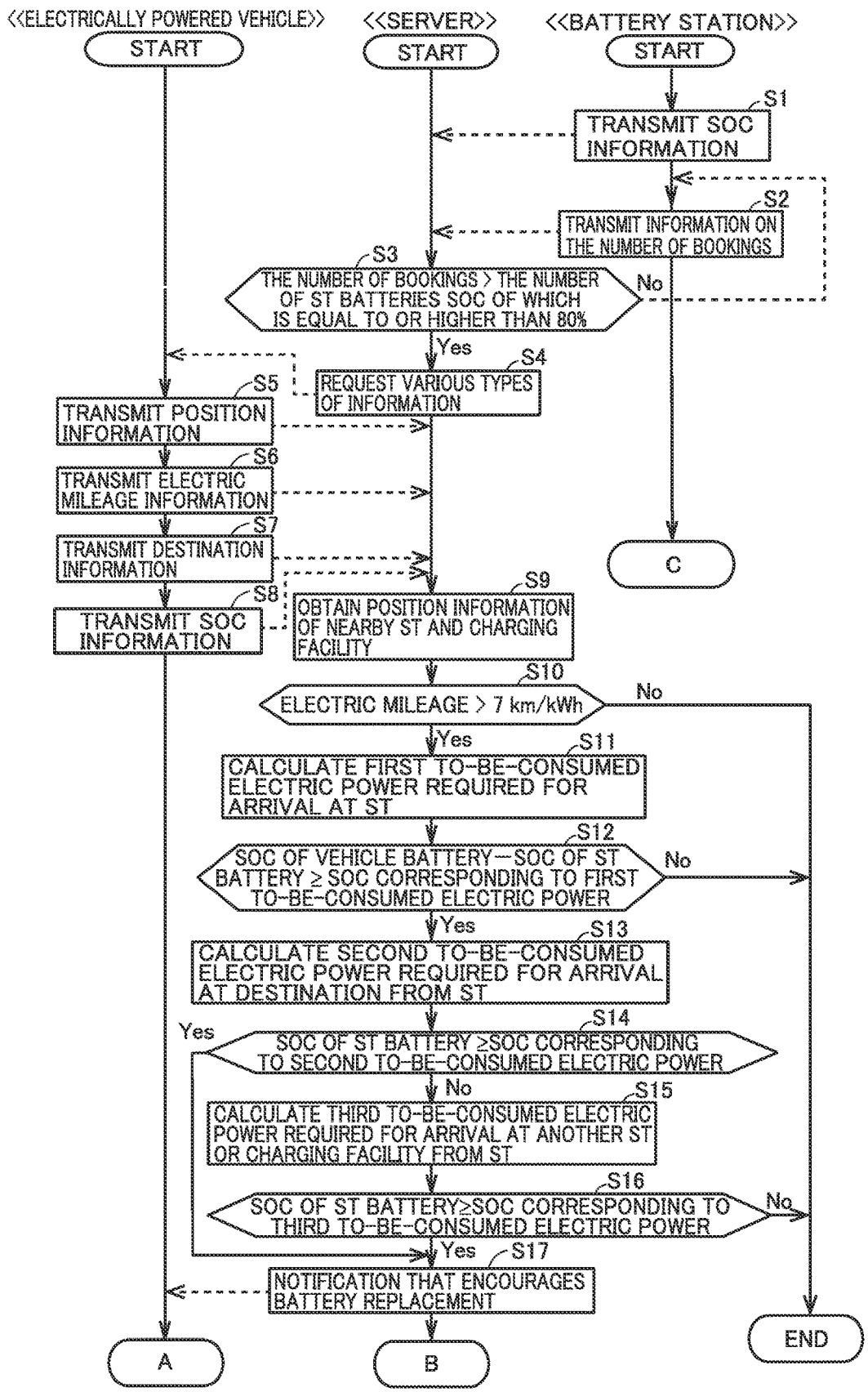
FIG. 2 is a first diagram showing sequence control in the control system according to one embodiment.

Sequence control in control system 1 in the present embodiment will now be described with reference to FIG. 2. An example shown in FIG. 2 is merely by way of example and the order or the like of processing steps is not limited to that shown in FIG. 2.

In step S1, battery station 20 (processor 22a) transmits through communication unit 22c, information on the SOC of each of a plurality of batteries 21 stored at battery station 20. Server 100 (processor 101) thus obtains the information on the SOC of each of the plurality of batteries 21 stored at battery station 20.

In step S2, battery station 20 (processor 22a) transmits through communication unit 22c, information on the number of bookings of battery replacement at battery station 20. Server 100 (processor 101) thus obtains the information on the number of bookings. Booking information of battery station 20 may be managed by server 100. The information on the number of bookings is exemplary "information on the number of intended batteries" in the present disclosure.

In step S3, server 100 (processor 101) determines whether or not the number of bookings obtained in the processing in step S2 is larger than the number of batteries 21 having the SOC equal to or higher than 80% provided at battery station 20. When the number of bookings is larger than the number of batteries 21 (in the case of Yes in S3), the process proceeds to step S4. When the number of bookings is equal to or smaller than the number of batteries 21 (in the case of No in S3), the process returns to step S2. Eighty percent is an exemplary "prescribed first threshold value" in the present disclosure.

In step S4, server 100 (processor 101) requests the user of electrically powered vehicle 10 through communication unit 103 to provide various types of information corresponding to steps S5 to S8 which will be described later. When server 100 manages a plurality of electrically powered vehicles 10, server 100 may randomly select at least one of the plurality of electrically powered vehicles 10 and make the request to selected electrically powered vehicle 10.

In step S5, electrically powered vehicle 10 (ECU 13) transmits position information thereof to server 100 through communication instrument 14. Server 100 (processor 101) thus obtains the position information of electrically powered vehicle 10.

In step S6, electrically powered vehicle 10 (ECU 13) transmits through communication instrument 14 to server 100, information on an electric mileage (electric power consumption) thereof. Server 100 (processor 101) thus obtains the information on the electric mileage of electrically powered vehicle 10.

In step S6, for example, electrically powered vehicle 10 transmits to communication unit 103, information on an average value or the like of an amount of power consumption for a prescribed period (for example, a week) in the past as the information on the electric mileage. Alternatively, server 100 may use as the electric mileage of electrically powered vehicle 10, a catalogue value (designed value) of the electric mileage in accordance with a model of electrically powered vehicle 10.

In step S7, electrically powered vehicle 10 (ECU 13) transmits through communication instrument 14 to server 100, information on a destination (position information of the destination) of electrically powered vehicle 10. Server 100 (processor 101) thus obtains the information on the destination of electrically powered vehicle 10.

In step S8, electrically powered vehicle 10 (ECU 13) transmits through communication instrument 14 to server 100, information on the SOC of battery 11. Server 100 (processor 101) thus obtains the information on the SOC of battery 11. The information in steps S5 to S8 may be transmitted from a not-shown portable terminal or the like of the user to the server.

The information corresponding to steps S1, S2, and S5 to S8 does not have to be transmitted from electrically powered vehicle 10 or battery station 20 to server 100. Server 100 may obtain the information through the Internet. For example, server 100 (processor 101) may obtain the information on the destination by referring to information inputted to navigation system 12 of electrically powered vehicle 10. Alternatively, processor 101 may obtain the information on the destination by estimating the destination by learning of a history of movement of electrically powered vehicle 10.

In step S9, server 100 (processor 101) obtains position information of another battery station and a battery charging facility. Specifically, processor 101 obtains the position information of another battery station and the battery charging facility around battery station 20 (for example, within 5 km from battery station 20). For example, processor 101 may transmit a notification to check the position information to the another battery station and the battery charging facility. The position information may be obtained through communication unit 103 from the Internet. The position information may be transmitted from battery station 20 to server 100. Another battery station and the battery charging facility are exemplary "another battery replacement station" and an exemplary "battery charging facility" in the present disclosure, respectively.

In step S9, server 100 (processor 101) may obtain congestion information of another battery station and the battery charging facility and determine whether or not batteries are replaceable based on the congestion information. Processor 101 may give a notification to check the position information when it determines that the batteries are replaceable.

The order of processing in steps S5 to S9 is not limited to the order described above. For example, the processing in steps S5 to S9 may simultaneously be performed.

In step S10, server 100 (processor 101) determines whether or not the electric mileage of electrically powered vehicle 10 is more than 7 km/kWh. When the electric mileage is more than 7 km/kWh (in the case of Yes in S10), the process proceeds to step S11. When the electric mileage is equal to or less than 7 km/kWh (in the case of No in S10), the process ends. A threshold value other than 7 km/kWh may be used for determination in step S10. Seven kilometers/kWh represents an exemplary "prescribed second threshold value" in the present disclosure.

In step S11, server 100 (processor 101) calculates first to-be-consumed electric power required for arrival of electrically powered vehicle 10 at battery station 20 from the current position. Specifically, processor 101 calculates a distance between electrically powered vehicle 10 and battery station 20 based on the position information of electrically powered vehicle obtained in the processing in step S5 and the position information of battery station 20 stored in memory 102. Processor 101 then calculates the first to-be-consumed electric power based on the calculated distance and the information on the electric mileage of electrically powered vehicle 10 obtained in the processing in step S6.

In step S12, server 100 (processor 101) determines whether or not a difference between the SOC of battery 11 of electrically powered vehicle 10 and the SOC of battery 21 lower in SOC than battery 11 is equal to or larger than the SOC corresponding to the first to-be-consumed electric power. When there is battery 21 that satisfies a determination condition in step S12 (in the case of Yes in step S12), the process proceeds to step S13. When there is no battery 21 that satisfies the determination condition in step S12 (in the case of No in step S12), the process ends.

In step S13, server 100 (processor 101) calculates second to-be-consumed electric power required for arrival of electrically powered vehicle 10 at the destination from battery station 20. Specifically, processor 101 calculates a distance between the destination and battery station 20 based on the position information of the destination obtained in the processing in step S7 and the position information on battery station 20 stored in memory 102. Processor 101 then calculates the second to-be-consumed electric power based on the calculated distance and the information on the electric mileage of electrically powered vehicle 10 obtained in the processing in step S6.

In step S14, server 100 (processor 101) determines whether or not the SOC of battery 21 lower in SOC than battery 11 is equal to or higher than the SOC corresponding to the second to-be-consumed electric power. Specifically, processor 101 determines whether or not battery 21 that satisfies the determination condition in step S12 includes battery 21 having the SOC equal to or higher than the SOC corresponding to the second to-be-consumed electric power. When a determination condition in step S14 is satisfied (in the case of Yes in S14), the process proceeds to step S17.

When the determination condition in step S14 is not satisfied (in the case of No in S14), the process proceeds to step S15.

In step S15, server 100 (processor 101) calculates third to-be-consumed electric power required for arrival at another battery station and the battery charging facility from battery station 20. Specifically, processor 101 calculates a distance between each of another battery station and the battery charging facility and battery station 20 based on the position information of each of another battery station and the battery charging facility obtained in the processing in step S9 and the position information of battery station 20 stored in memory 102. Processor 101 then calculates the third to-be-consumed electric power based on the calculated distance and the information on the electric mileage of electrically powered vehicle 10 obtained in the processing in step S6.

In step S16, server 100 (processor 101) determines whether or not the SOC of battery 21 lower in SOC than battery 11 is equal to or higher than the SOC corresponding to the third to-be-consumed electric power. Specifically, processor 101 determines whether or not battery 21 that satisfies the determination condition in step S12 includes battery 21 having the SOC equal to or higher than the SOC corresponding to the third to-be-consumed electric power.

When a plurality of third to-be-consumed electric powers are calculated because of provision of a plurality of facilities (other battery stations and battery charging facilities) around battery station 20, determination in step S16 is made based on a minimum value among the plurality of third to-be-consumed electric powers.

In step S17, server 100 (processor 101) gives a notification that encourages battery replacement to electrically powered vehicle 10 through communication unit 103.

Figure 3:
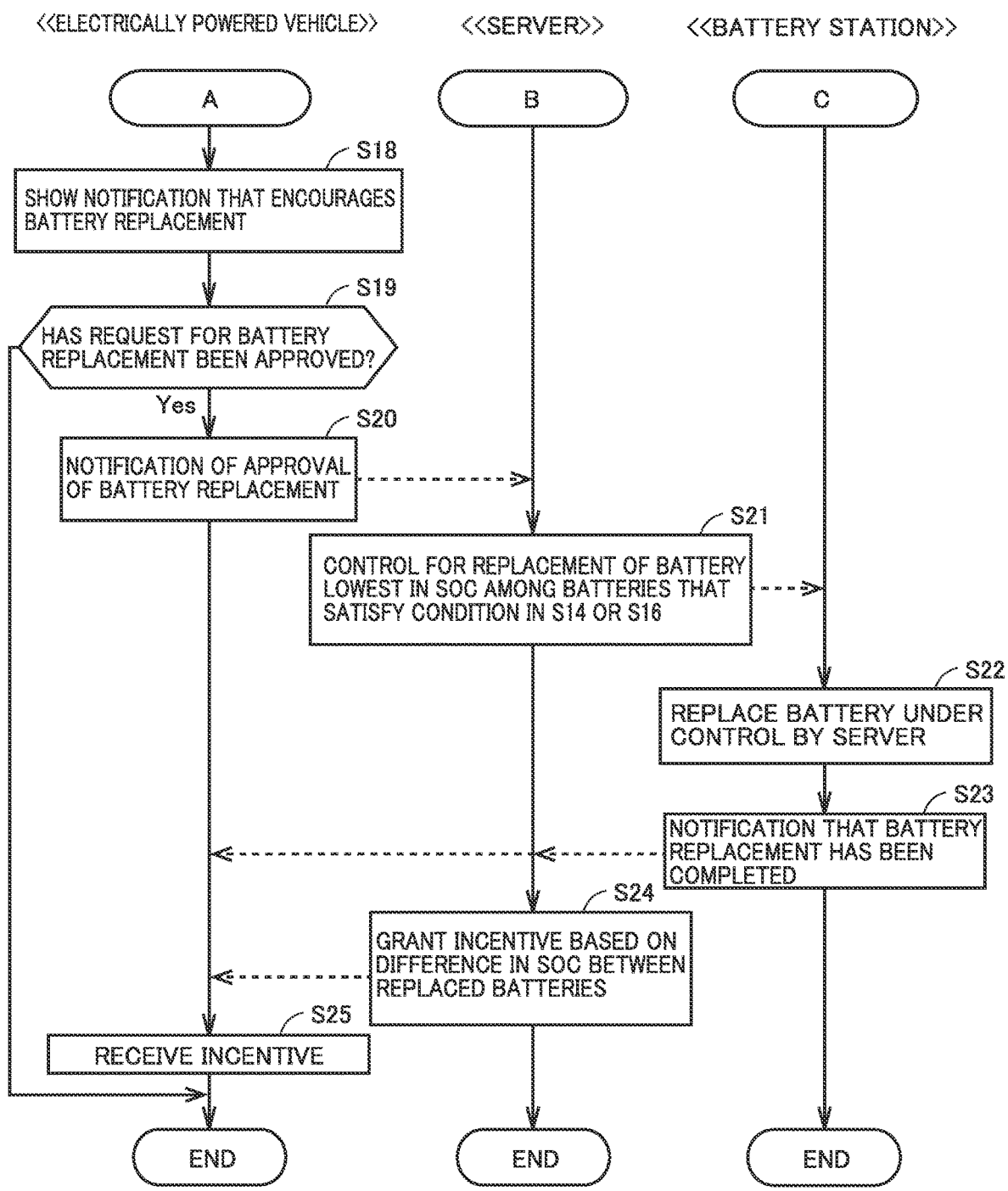
FIG. 3 is a second diagram showing sequence control in the control system according to one embodiment.

Processing in step S18 or later will now be described with reference to FIG. 3. In step S18, electrically powered vehicle 10 (ECU 13) has a notification that encourages battery replacement shown on navigation system 12 based on the notification in step S17. The notification may be shown on a not-shown portable terminal or the like of the user.

Figure 4:
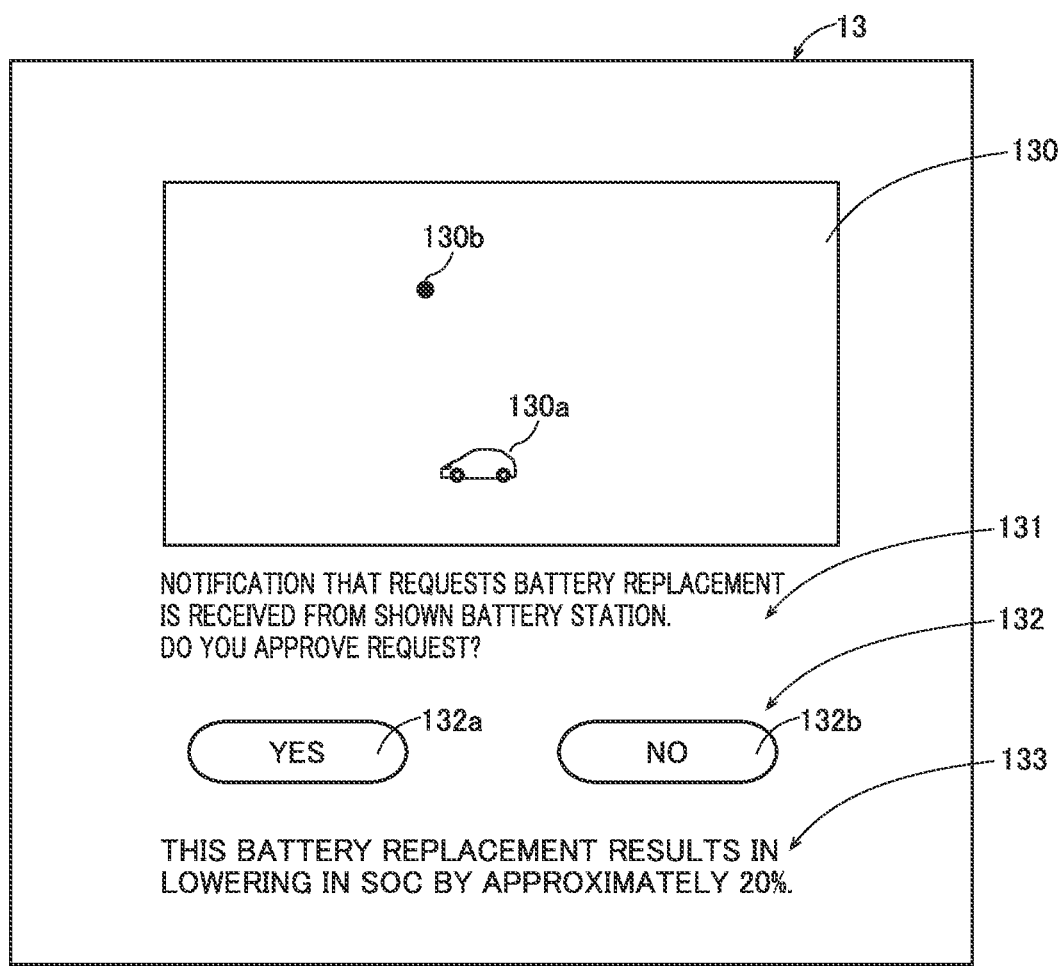
FIG. 4 is a diagram showing an image on a navigation system of an electrically powered vehicle according to one embodiment.

Specifically, electrically powered vehicle 10 (ECU 13) has an image in FIG. 4 shown on navigation system 12. The image shown in FIG. 4 shows a digital map 130 including the position information (see a vehicle mark 130a in FIG. 4) of electrically powered vehicle 10 at the current time point and a position (see a circle 130b in FIG. 4) of battery station 20 that requests battery replacement.

The image shown in FIG. 4 shows a message 131 indicating that battery station 20 requests battery replacement. The image shown in FIG. 4 shows a selection section 132 for confirmation as to whether or not to meet the request for battery replacement. Selection section 132 includes a button 132a indicating "YES" and a button 132b indicating "NO". The image shown in FIG. 4 shows precautions 133 indicating an amount of lowering in SOC of electrically powered vehicle 10 when battery replacement is performed.

In step S19, electrically powered vehicle 10 (ECU 13) determines whether or not the request for battery replacement has been approved. Specifically, ECU 13 determines whether or not button 132a (see FIG. 4) has been selected (touched) by the user in a screen shown on navigation system 12 in step S18. When button 132a is selected (in the case of Yes in S19), the process proceeds to step S20. When button 132b (see FIG. 4) is selected (in the case of No in S19), the process ends.

In step S20, electrically powered vehicle 10 (ECU 13) transmits through communication instrument 14 to server 100, a notification (signal) indicating approval by the user, of the request for battery replacement.

In step S21, server 100 (processor 101) controls battery station 20 in accordance with processing in step S20 such that battery 21 lowest in SOC among batteries 21 that satisfy the condition in step S14 or S16 (determination as Yes in S14 or S16) is replaced with battery 11 of electrically powered vehicle 11. Specifically, processor 101 transmits through communication unit 103 to battery station 20, a command signal for replacement between battery 21 lowest in SOC and battery 11 of electrically powered vehicle 10.

In step S22, control device 22 (processor 22a) is controlled in accordance with the processing (command signal) in step S21. Consequently, drive apparatus 23 is driven and the batteries are replaced.

In step S23, battery station 20 (processor 22a) notifies each of server 100 and electrically powered vehicle 10 of completion of battery replacement.

In step S24, server 100 (processor 101) carries out control to grant the user of electrically powered vehicle 10 an incentive based on the difference (the SOC of battery 11−the SOC of battery 21) between the SOC of battery 11 and the SOC of battery 21 replaced at battery station 20. A price (for example, money or points) comparable to the total of costs required for charging by an amount of the difference and fees required for battery replacement is granted to the user as the incentive. A table that shows relation between the difference and the incentive may be stored in memory 102.

In step S25, the user of electrically powered vehicle 10 receives the incentive in accordance with the processing in step S24.

As set forth above, in the embodiment, when battery 21 lower in SOC than battery 11 is provided at battery station 20, the notification that encourages battery replacement is given to the user of electrically powered vehicle 10. Electrically powered vehicle 10 thus transports to battery station 20, battery 11 higher in SOC than battery 21 lowest in SOC among the plurality of batteries 21. Consequently, a battery available for battery replacement can be prepared at battery station 20 more readily than in an example where battery 21 is charged at battery station 20 or battery 21 is charged at another charging facility.

The sequence diagram shown in FIG. 2 is merely by way of example, and the present disclosure is not limited to the example above. For example, determination in at least one of steps S10, S14, and S16 does not have to be made. Specifically, determination only in steps S10 and S12 may be made. Alternatively, determination only in steps S12 and S14 may be made. Alternatively, determination only in steps S12 and S16 may be made. Alternatively, determination only in steps S10, S12, and S14 may be made. Alternatively, determination only in steps S10, S12, and S16 may be made. Alternatively, determination only in steps S12, S14, and S16 may be made.

Though an example in which whether or not the difference between the SOC of battery 11 and the SOC of battery 21 lower in SOC than battery 11 is equal to or higher than the SOC corresponding to the first to-be-consumed electric power is shown in the embodiment, the present disclosure is not limited as such. Determination as to whether or not the difference between the SOC of battery 11 and the SOC of battery 21 lower in SOC than battery 11 is higher than 0 (which is referred to as determination A) may be made. In other words, whether or not at least one battery 21 lower in SOC than battery 11 is provided at battery station 20 may be determined. Determination A and determination in at least one of steps S10, S14, and S16 may be made (determination A+S10, determination A+S14, determination A+S16, determination A+S10+S14, determination A+S10+S16, determination A+S14+S16, and determination A+S10+S14+S16).

Though an example in which the notification that encourages battery replacement is given when the number of bookings of battery replacement is larger than the number of batteries 21 having the SOC equal to or higher than 80% (the prescribed first threshold value) is shown in the embodiment, the present disclosure is not limited as such. For example, when the number of batteries intended for replacement (schedule) is predicted from the number of electrically powered vehicles 10 around battery station 20 and when the number of intended batteries is larger than the number of batteries 21, the notification may be given.

Though an example in which the notification that encourages battery replacement is given when the SOC of battery 21 is equal to or higher than one of the SOC corresponding to the second to-be-consumed electric power (see step S14) and the SOC corresponding to the third to-be-consumed electric power (see step S16) is shown in the embodiment, the present disclosure is not limited as such. When the SOC of battery 21 is equal to or higher than the SOC corresponding to the second to-be-consumed electric power and equal to or higher than the SOC corresponding the third to-be-consumed electric power, the notification that encourages battery replacement may be given.

Though an example in which the third to-be-consumed electric power is calculated based on the position information of each of another battery station and the battery charging facility around battery station 20 is shown in the embodiment, the present disclosure is not limited as such. The third to-be-consumed electric power may be calculated based on the position information of any one of another battery station and the battery charging facility.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method of controlling battery replacement at a battery replacement station provided with at least one battery that is replaced with a battery of an electrically powered vehicle, the battery of the electrically powered vehicle being a first battery, the battery provided at the battery replacement station being a second battery, the method comprising:
   obtaining information on the first battery;
   obtaining an electric mileage of the electrically powered vehicle including power consumption in accordance with a model of the electrically powered vehicle;
   giving a user of the electrically powered vehicle a notification that encourages the battery replacement when the second battery lower in SOC than an SOC of the first battery is provided at the battery replacement station;
   controlling the battery replacement station to activate a drive apparatus of the battery replacement station such that the first battery and the second battery lower in SOC than the SOC of the first battery are replaced with each other;
   granting the user of the electrically powered vehicle an incentive based on a difference between the SOC of the first battery and the SOC of the second battery; and
   displaying the notification as an image, the image showing a digital map including position information of the electrically powered vehicle at a current time point and a position, a selection section for confirmation to meet the request for battery replacement, and precautions indicative of an amount of lowering in the SOC of the electrically powered vehicle when the battery replacement is performed.

2. The method of controlling battery replacement according to claim 1, further comprising obtaining information on the number of batteries intended for replacement at the battery replacement station, wherein
the giving the notification is a notification that encourages the battery replacement when the number of intended batteries is larger than the number of second batteries having an SOC equal to or higher than a prescribed first threshold value.

3. The method of controlling battery replacement according to claim 2, wherein
the obtaining information on the number of intended batteries includes obtaining information on the number of bookings of the battery replacement at the battery replacement station.

4. The method of controlling battery replacement according to claim 1, further comprising:
obtaining position information of the electrically powered vehicle;
obtaining information on an electric mileage of the electrically powered vehicle; and
calculating first to-be-consumed electric power required for the electrically powered vehicle for arrival at the battery replacement station, wherein
the giving the notification is a notification that encourages the battery replacement when the difference between the SOC of the first battery and the SOC of the second battery lower in the SOC than the first battery is equal to or larger than an SOC corresponding to the first to-be-consumed electric power.

5. The method of controlling battery replacement according to claim 1, further comprising:
obtaining information on a destination of the electrically powered vehicle;
obtaining information on an electric mileage of the electrically powered vehicle; and
calculating second to-be-consumed electric power required for arrival at the destination from the battery replacement station, wherein
the giving the notification is a notification that encourages the battery replacement when the SOC of the second battery lower in SOC than the SOC of the first battery is equal to or higher than an SOC corresponding to the second to-be-consumed electric power.

6. The method of controlling battery replacement according to claim 1, further comprising:
obtaining information on an electric mileage of the electrically powered vehicle;
obtaining position information of at least one of another battery replacement station and a battery charging facility; and
calculating third to-be-consumed electric power required for arrival at the another battery replacement station or the battery charging facility from the battery replacement station, wherein the giving a notification includes a notification that encourages the battery replacement when the SOC of the second battery lower in SOC than the SOC of the first battery is equal to or higher than an SOC corresponding to the third to-be-consumed electric power.

7. The method of controlling battery replacement according to claim 1, further comprising:
obtaining information on an electric mileage of the electrically powered vehicle, wherein
the giving the notification is a notification that encourages the battery replacement when the electric mileage is more than a prescribed second threshold value.

8. A battery replacement control device that controls a battery replacement station provided with at least one battery that is replaced with a battery of an electrically powered vehicle, the battery of the electrically powered vehicle being a first battery, the battery provided at the battery replacement station being a second battery, the battery replacement control device comprising:
one or more communication interfaces that obtains information on the first battery; and
a controller that gives a notification that encourages battery replacement to a user of the electrically powered vehicle when the second battery lower in SOC than an SOC of the first battery is provided at the battery replacement station, wherein
the controller controls the battery replacement station to activate a drive apparatus of the battery replacement station such that the first battery and the second battery lower in the SOC than the SOC of the first battery are replaced with each other,
the controller obtains an electric mileage of the electrically powered vehicle including power consumption in accordance with a model of the electrically powered vehicle,
the controller grants the user of the electrically powered vehicle an incentive based on a difference between the SOC of the first battery and the SOC of the second battery, and
the controller displays the notification as an image, the image showing a digital map including position information of the electrically powered vehicle at a current time point and a position, a selection section for confirmation to meet the request for battery replacement, and precautions indicative of an amount of lowering in the SOC of the electrically powered vehicle when the battery replacement is performed.

9. A battery replacement control system comprising:
a first processing apparatus that processes battery replacement at a battery replacement station provided with at least one battery that is replaced with a battery of an electrically powered vehicle, the battery of the electrically powered vehicle being a first battery, the battery provided at the battery replacement station being a second battery; and
a second processing apparatus that gives a notification that encourages the battery replacement to a user of the electrically powered vehicle when the second battery lower in SOC than an SOC of the first battery is provided at the battery replacement station, wherein the second processing apparatus controls the first processing apparatus to activate a drive apparatus of the first processing apparatus such that the first battery and the second battery lower in SOC than the SOC of the first battery are replaced with each other,
the second processing apparatus obtains an electric mileage of the electrically powered vehicle including power consumption in accordance with a model of the electrically powered vehicle, the second processing apparatus grants the user of the electrically powered vehicle an incentive based on a difference between the SOC of the first battery and the SOC of the second battery, and the second processing apparatus displays the notification as an image, the image showing a digital map including position information of the electrically powered vehicle at a current time point and a position, a selection section for confirmation to meet the request for battery replacement, and precautions indicative of an amount of lowering in the SOC of the electrically powered vehicle when the battery replacement is performed.

10. The method of controlling battery replacement according to claim 1, further comprising transmitting a command signal to the battery replacement station through one or more communication interfaces for replacement between the second battery having the lowest SOC amongst a plurality of second batteries and the first battery.

11. The method of controlling battery replacement according to claim 1, further comprising obtaining the information on the destination by estimating the destination based on learning a history of movement of the electrically powered vehicle.

12. The method of controlling battery replacement according to claim 1, further comprising obtaining an average value of electric mileage of the electrically powered vehicle including power consumption for a predetermined time period.

13. The battery replacement control device according to claim 8, wherein the controller is configured to transmit a command signal to the battery replacement station through the one or more communication interfaces for replacement between the second battery having the lowest SOC amongst a plurality of second batteries and the first battery.

14. The battery replacement control device according to claim 8, wherein the controller is configured to obtain the information on the destination by estimating the destination based on learning a history of movement of the electrically powered vehicle.

15. The battery replacement control device according to claim 8, wherein the controller is configured to obtain an average value of electric mileage of the electrically powered vehicle including power consumption for a predetermined time period.

16. The method of controlling battery replacement according to claim 1 further comprising obtaining the position information of another battery station and the battery charging facility within a predetermined distance from the battery station.

17. The method of controlling battery replacement according to claim 1 further comprising transmitting a second notification to check the position information to another battery station and the battery charging facility.

18. The method of controlling battery replacement according to claim 1 further comprising obtaining congestion information of another battery station and the battery charging facility, and determining whether or not the first and the second batteries are replaceable based on the congestion information.

* * * * *